United States Patent
Prang et al.

(10) Patent No.: US 9,650,454 B2
(45) Date of Patent: May 16, 2017

(54) PROCESS FOR ETHYLENE POLYMERIZATION WITH IMPROVED SLURRY PUMP PERFORMANCE

(71) Applicant: Basell Polyolefine GmbH, Wesseling (DE)

(72) Inventors: Harald Prang, Erftstadt (DE); Suresh Babu Vatti, Visakhapatnam (IN); Peter Rohrbach, Ingolstadt (DE); Mudit Ashtana, Ingolstadt (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/309,158

(22) PCT Filed: May 13, 2015

(86) PCT No.: PCT/EP2015/060568
§ 371 (c)(1),
(2) Date: Nov. 4, 2016

(87) PCT Pub. No.: WO2015/177014
PCT Pub. Date: Nov. 26, 2015

(65) Prior Publication Data
US 2017/0073440 A1  Mar. 16, 2017

(30) Foreign Application Priority Data
May 20, 2014  (EP) .................................... 14169075

(51) Int. Cl.
*C08F 110/02* (2006.01)
*C08F 2/01* (2006.01)
*C08F 2/12* (2006.01)
*B01J 19/18* (2006.01)
*B01J 19/00* (2006.01)
*C08F 2/14* (2006.01)

(52) U.S. Cl.
CPC .......... *C08F 110/02* (2013.01); *B01J 19/006* (2013.01); *B01J 19/18* (2013.01); *B01J 19/1862* (2013.01); *B01J 2219/00765* (2013.01)

(58) Field of Classification Search
CPC ..... C08F 2/01; C08F 2/14; B01J 19/18; B01J 2219/00765
USPC .............................. 526/65, 68, 918; 422/135
See application file for complete search history.

(56) References Cited

U.S. PATENT DOCUMENTS

| | | | |
|---|---|---|---|
| 3,081,289 A * | 3/1963 | Cheney et al. ....... | C08F 110/06 261/123 |
| 2009/0149610 A1 | 6/2009 | Sato et al. | |
| 2010/0311923 A1 | 12/2010 | Sato et al. | |
| 2011/0172375 A1 | 7/2011 | Yeh et al. | |

OTHER PUBLICATIONS

PCT International Search Report & Written Opinion mailed Dec. 10, 2015 for PCT/EP2015/060568.

* cited by examiner

*Primary Examiner* — Fred M Teskin (57) ABSTRACT

A slurry polymerization process comprising polymerizing monomers in a reactor comprising baffles, a first slurry feed line for returning cooled slurry from a cooler and optionally a second slurry feed line for transferring reactor slurry from a previous reactor of a cascade of polymerization reactors, wherein the baffle top, the first slurry feed line discharge end and the second slurry feed line end are located below the reactor liquid level.

20 Claims, 4 Drawing Sheets

PROCESS FOR ETHYLENE POLYMERIZATION WITH IMPROVED SLURRY PUMP PERFORMANCE

This application is the U.S. National Phase of PCT International Application PCT/EP2015/060568, filed May 13, 2015, claiming benefit of priority to European Patent Application No. 14169075.0, filed May 20, 2014, the disclosures of which are incorporated herein by reference in their entirety.

FIELD OF THE INVENTION

The present disclosure relates to a process for ethylene polymerization. In some embodiments, the present disclosure relates to an ethylene slurry polymerization process having improved slurry pump performance through reduced pump blockages.

BACKGROUND OF THE INVENTION

Polyethylenes are categorized according to their densities, which are often used as a guide to end-use applications. For example, high density polyethylene (HDPE) has a low degree of branching, which results in a compact structure having high tensile strength. HDPE is used in products such as pipes and drums. Medium density polyethylene (MDPE) has a high degree of chemical resistance as well as shock and drop resistance, and is used in products such as shrink film. Low density polyethylene (LDPE) possesses random long chain branching, with "branches on branches". LDPE can provide good resistance to high temperatures and impact, and has been used in applications such as cling film and squeezable bottles. Linear low density polyethylene (LLDPE) has an essentially linear structure but also has low density because of its short chain branching, and is used in applications such as stretch film and coatings for cables.

Various processes can be used to produce polyethylene, including gas phase processes, solution processes, and slurry processes. In ethylene slurry polymerization processes, diluents such as hexane or isobutane may be used to dissolve the ethylene monomer, comonomers and hydrogen, and the monomer(s) are polymerized with a catalyst. Following polymerization, the polymer product formed is present as a slurry suspended in the liquid medium.

In typical multi-reactor cascade processes, such as those disclosed, e.g., in WO 2012/028591 A1, U.S. Pat. No. 6,204,345 B1, and WO 2005/077992 A1, monomer(s), hydrogen, catalyst and diluent are fed into the first of three reactors where a slurry forms from the polymer particles contained within the diluent and unreacted monomer. The reactors can be operated in parallel or in series, and the types/amounts of monomer and conditions can be varied in each reactor to produce a variety of polyethylene materials, including unimodal (molecular weight distribution) or multimodal polyethylene material. Such multimodal compositions are used in a variety of applications; e.g., WO 2012/069400 A1 discloses trimodal polyethylene compositions for blow moldings.

A difficulty occasionally encountered by continuous stirred tank reactors in slurry polymerization systems is blockage of the inlets to the slurry pumps. This can occur if polymeric material that has accumulated on the reactor baffles, mechanical supports for the baffles, or the inner walls of the reactor suddenly become dislodged and flow with the reactor slurry to the slurry pump inlet. The dislodged material are lumps of polymer that quickly block the pump suction when the polymer lumps arrive at the pump inlet. The polymer lumps can build up over time from fouling that occurs when the slurry returned from an external slurry cooler is discharged into the vapor space above the liquid level in the reactor. Upon discharge, liquid in the slurry separates from the solids, i.e. flashes, leaving behind the sticky lumps of polymer that can adhere to the baffles, baffle support cross pieces and the reactor inner wall surfaces. In addition, reactor splashing may occur when the returned slurry drops onto the liquid surface of the reactor contents, depositing solids onto the exposed metal surfaces. Repeated deposition can cause the polymeric material to gradually grow into lumps of polymer adhered to the metal surfaces. These large polymer lumps eventually may fall off due to cycling of the reactor liquid level or drying of the polymer on the metal surfaces inside the reactor, causing a loss of adhesion. However, in either case, the polymer lumps eventually flow to the slurry pump, block the pump impeller and sharply reduce the flow of slurry through the slurry cooler. Blockage of the slurry pumps in turn can cause operational interruptions since the pumps must be isolated and cleaned.

Baffled polymerization reactors have been used in olefin polymerization reaction systems. For example, WO 2009/142730 A1 and U.S. Pat. No. 8,410,230 B2 relate to an olefin polymerization process for producing polymers having broadened molecular weight using internal baffles that separate the reactor zones. U.S. Pat. No. 7,214,750 B2 discloses a process for producing polymers in a reactor using tubular heat-exchanger bundles as baffles in the periphery of the vessel, and U.S. Pat. No. 7,993,593 B2 discloses an olefin polymerization reactor having a tubular baffle containing a gas inlet orifice. Nonetheless, a continuing need exists for an ethylene slurry polymerization processes having improved slurry pump performance through reduced pump blockage.

SUMMARY OF THE INVENTION

The present disclosure generally relates to ethylene slurry polymerization processes having improved slurry pump performance are disclosed herein.

In some embodiments, a slurry polymerization process comprising polymerizing monomers in a reactor at a temperature from 60° C. to 95° C. and a pressure from 0.15 MPa to 3.0 MPa to form polyethylene where the polymerization occurs in the presence of a catalyst, monomers, diluent and optionally hydrogen in the reactor slurry is provided, the reactor comprising:
  a cylindrical reactor wall comprising an inner reactor wall surface, extending from a bottom tangent to a top tangent;
  a bottom reactor head connected to the cylindrical reactor wall at the bottom tangent;
  a top reactor head connected to the cylindrical reactor wall at the top tangent, the cylindrical reactor wall, bottom reactor head and top reactor head forming an internal reactor volume;
  an agitator for mixing the contents of the internal reactor volume;
  a reactor outlet for feeding a reactor slurry to a cooler, the reactor slurry comprising diluent, catalyst, polymer, unreacted monomer and optionally dissolved hydrogen,
  a reactor baffle system comprising at least one baffle, the at least one baffle comprising a baffle top and a baffle bottom, where the at least one baffle is connected to the reactor inner wall surface and extends longitudinally along the reactor inner wall surface and radially into the internal reactor volume, a first reactor inlet for returning cooled slurry from the cooler as a first reactor slurry stream; and a cooled slurry feed line having a first feed line inlet end, which is connected to the first reactor inlet, and a first feed line discharge end, wherein the top surface of the reactor slurry within the internal reactor volume defines a reactor liquid level and the baffle top and the first feed line discharge end are located below the reactor liquid level.

In some embodiments, a slurry polymerization process comprising polymerizing monomers in a reactor at a temperature from 60° C. to 95° C. and a pressure from 0.15 MPa to 3.0 MPa to form polyethylene where the polymerization occurs in the presence of a catalyst, monomers, diluent and optionally hydrogen in the reactor slurry is provided, the reactor comprising:

a cylindrical reactor wall comprising an inner reactor wall surface, extending from a bottom tangent to a top tangent;

a bottom reactor head connected to the cylindrical reactor wall at the bottom tangent;

a top reactor head connected to the cylindrical reactor wall at the top tangent, the cylindrical reactor wall, bottom reactor head and top reactor head forming an internal reactor volume;

an agitator for mixing the contents of the internal reactor volume;

a reactor outlet for feeding a reactor slurry to a cooler, the reactor slurry comprising diluent, catalyst, polymer, unreacted monomer and optionally dissolved hydrogen, a reactor baffle system comprising at least one baffle, the at least one baffle comprising a baffle top and a baffle bottom, where the at least one baffle is connected to the reactor inner wall surface and extends longitudinally along the reactor inner wall surface and radially into the internal reactor volume, a first reactor inlet for returning cooled slurry from the cooler as a first reactor slurry stream;

a cooled slurry feed line having a first feed line inlet end, which is connected to the first reactor inlet, and a first feed line discharge end;

a second reactor inlet for receiving a second reactor slurry stream; and a second reactor slurry stream feed line having a second feed line inlet end, which is connected to the second reactor inlet, and a second feed line discharge end, wherein the top surface of the reactor slurry within the internal reactor volume defines a reactor liquid level and the baffle top, the first feed line discharge end, and the second feed line discharge end are located below the reactor liquid level.

DETAILED DESCRIPTION OF THE INVENTION

Polyethylene Slurry Production Process

The process of the present disclosure to produce polyethylene with reduced slurry pump blockage includes the slurry polymerization of monomers in the presence of a catalyst, a diluent, such as hexane or isobutane, and optionally hydrogen. The polymerization proceeds in a suspended slurry formed from polymer particles in the diluent, unreacted monomers and catalyst. Polyethylene polymers obtained by the process described in the present disclosure can be ethylene homopolymers or copolymers of ethylene containing up to 40 wt. % of $C_3$-$C_{10}$-1-alkenes. Accordingly, the monomers are ethylene as main monomer and $C_3$-$C_{10}$-1-alkenes as comonomers. The comonomers may be chosen from 1-butene, 1-pentene, 1-hexene, 1-octene or mixtures thereof. The slurry polymerization process is at temperatures from 60° C. to 95° C., or in the alternative from 65° C. to 90° C., or from 70° C. to 85° C., and at pressures from 0.15 MPa to 3 MPa, or in the alternative from 0.2 to 2 MPa, or from 0.25 to 1.5 MPa.

The polyethylene polymers produced by the polymerization process may be high density polyethylene resins which may have a density in the range from 0.935 $g/cm^3$ to 0.970 $g/cm^3$. The density may be in the range from 0.940 $g/cm^3$ to 0.970 $g/cm^3$, or the density is in the range from 0.945 $g/cm^3$ to 0.965 $g/cm^3$. Density may be measured according to DIN EN ISO 1183-1:2004, Method A (Immersion) with compression molded plaques of 2 mm thickness which were prepared with a defined thermal history: Pressed at 180° C., 20 MPa for 8 min with subsequent crystallization in boiling water for 30 min.

The polyethylene polymers produced by the polymerization process may have a melt index ($MI_{21.6}$) from 1 dg/min to 300 dg/min, or from 1.5 dg/min to 50 dg/min, or from 2 dg/min to 35 dg/min. The $MI_{21.6}$ may be measured according to DIN EN ISO 1133:2005, condition G at a temperature of 190° C. under a load of 21.6 kg.

The polyethylene polymers produced by the polymerization process may be an ethylene homopolymer or an ethylene copolymer that comprises up to 10 wt. % of recurring units of a $C_3$ to $C_{10}$ alpha-olefin. The $C_3$ to $C_{10}$ α-olefins may be selected from propylene, 1-butene, 1-pentene, 1-hexene, 1-octene, and mixtures thereof.

Catalyst

The polymerization can be carried out using customary ethylene polymerization catalysts, e.g., the polymerization can be carried out using Phillips catalysts based on chromium oxide, using titanium-based Ziegler-type catalysts, i.e., Ziegler-catalysts or Ziegler-Natta-catalysts, or using single-site catalysts. For the purposes of the present disclosure, single-site catalysts are catalysts based on chemically uniform transition metal coordination compounds. The single-site catalysts may comprise bulky sigma- or pi-bonded organic ligands, e.g. catalysts based on mono-Cp complexes, catalysts based on bis-Cp complexes, which are often designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are designated as hybrid catalysts.

Catalysts of the Ziegler type may comprise a compound of titanium or vanadium, a compound of magnesium and optionally a particulate inorganic oxide as support.

The titanium compounds may be halides or alkoxides of trivalent or tetravalent titanium, with titanium alkoxy halogen compounds or mixtures of various titanium compounds also being possible. Examples of titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-}i\text{-}C_3H_7)Cl_3$, $Ti(O\text{-}n\text{-}C_4H_9)Cl_3$, $Ti(OC_2H_5)Br_3$, $Ti(O\text{-}n\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$ or $Ti(O\text{-}n\text{-}C_4H_9)_4$. In an embodiment of the present disclosure, the titanium compounds may comprise chlorine as the halogen. In an embodiment, the titanium halides may comprise only halogen in addition to titanium or may be titanium chlorides or may be titanium tetrachloride. The vanadium compounds may be vanadium halides, vanadium oxyhalides, vanadium alkoxides or vanadium acetylacetonates. In an embodiment, the vanadium compounds are in an oxidation state of 3 to 5.

In the production of the solid component, at least one compound of magnesium may be additionally used. These compounds may be halogen-containing magnesium compounds such as magnesium halides including chlorides and bromides; or these compounds may be magnesium compounds from which the magnesium halides can be obtained in a customary, way, e.g. by reaction with halogenating agents. In an embodiment of the present disclosure, the halogens are selected from chlorine, bromine, iodine and fluorine or mixtures of two or more halogens, or in the alternative, the halogens are chlorine or bromine, or the halogens are chlorine.

Possible halogen-containing magnesium compounds are magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. The halogenating agents may be, for example, halogens, hydrogen halides, $SiCl_4$ or $CCl_4$. In one embodiment, the halogenating agents are chlorine or hydrogen chloride.

Examples of halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. In one embodiment, the halogen-free compounds of magnesium are n-butylethylmagnesium and n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

The magnesium compounds for producing the particulate solids may be, apart from magnesium dichloride or magnesium dibromide, the di($C_1$-$C_{10}$-alkyl)magnesium compounds. In one embodiment, the Ziegler-type catalyst comprises a transition metal selected from titanium, zirconium, vanadium, and chromium.

Catalysts of the Ziegler type may be polymerized in the presence of a cocatalyst. Cocatalysts may be organometallic compounds of metals of groups 1, 2, 12, 13 or 14 of the Periodic Table of Elements, or organometallic compounds of metals of group 13, and especially organoaluminum compounds. In one embodiment, cocatalysts are organometallic alkyls, organometallic alkoxides, and organometallic halides.

The organometallic compounds may be lithium alkyls, magnesium or zinc alkyls, magnesium alkyl halides, aluminum alkyls, silicon alkyls, silicon alkoxides and silicon alkyl halides. In an embodiment, the organometallic compounds comprise aluminum alkyls and magnesium alkyls or the organometallic compounds contain aluminum alkyls. In another embodiment, the organometallic compounds contain trialkylaluminum compounds, or the trialkylaluminum compounds are selected from trimethylaluminum, triethylaluminum, tri-isobutylaluminum, and tri-n-hexylaluminum.

Figure 1:
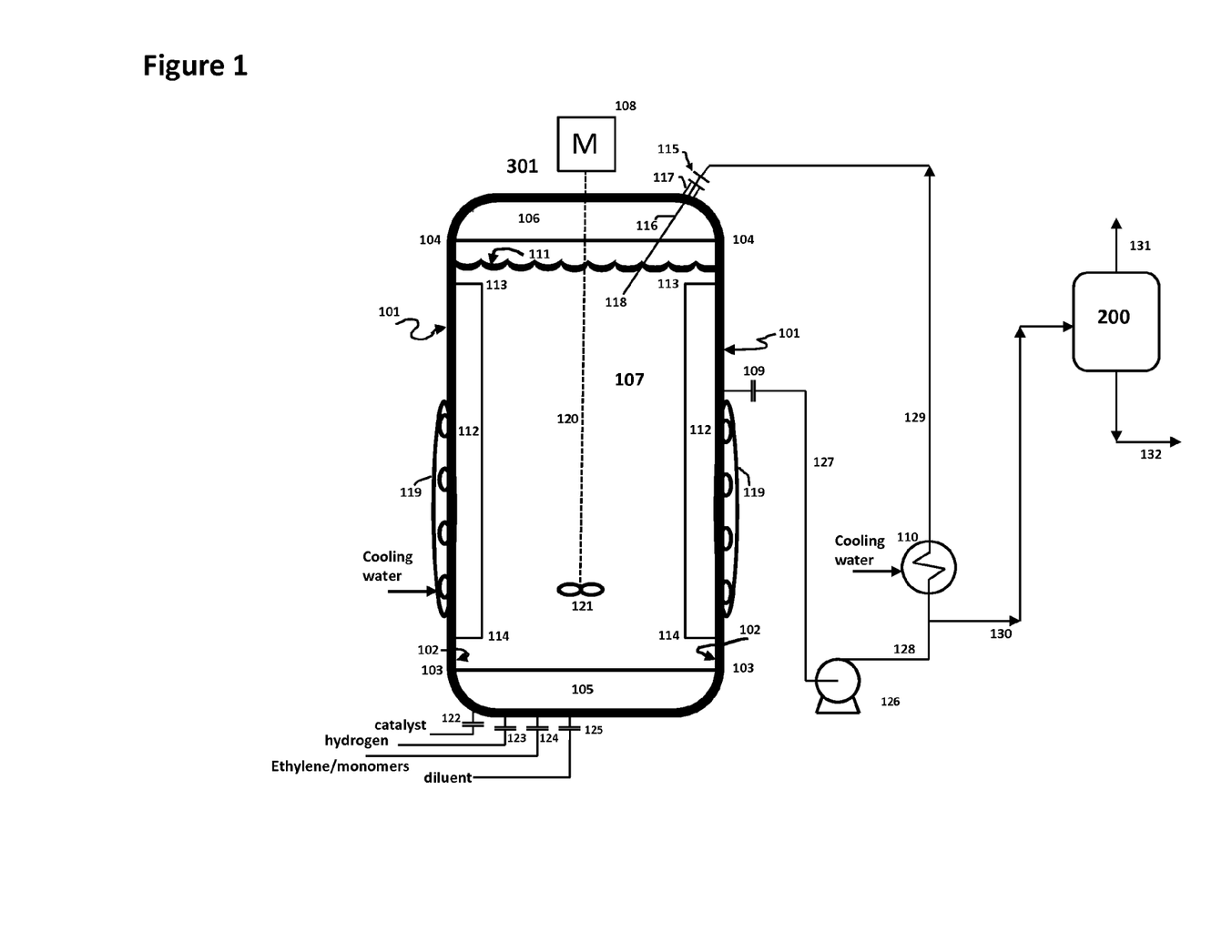
FIG. 1 depicts an illustrative flow diagram of an ethylene slurry polymerization system comprising a polymerization slurry reactor, external pump and cooler, agitator and baffle system.

FIG. 1 illustrates an embodiment of the present disclosure where monomers are polymerized in a reactor 301 to form polyethylene. The polymerization occurs in the presence of catalyst, diluent, ethylene and optionally hydrogen and comonomer in a reactor slurry that is in suspended form.

As shown in FIG. 1, reactor 301 includes a cylindrical reactor wall 101 having a reactor inner wall surface 102 that extends from a bottom tangent 103 to a top tangent 104; a bottom reactor head 105 connected to the cylindrical reactor wall 101 at the bottom tangent 103; a top reactor head 106 connected to the cylindrical reactor wall 101 at the top tangent 104, the cylindrical reactor wall 101, bottom reactor head 105 and top reactor head 106 forming an internal reactor volume 107; and an agitator 108 for mixing the contents of the internal reactor volume 107. The agitator 108 comprises a motor (M), a rotating shaft 120, which is substantially vertically installed centrally in the internal reactor volume 107, and at least one impeller 121.

The reactor 301 also comprises a reactor outlet 109 for feeding a reactor slurry to a cooler 110 using pump 126. The reactor slurry comprises diluent, catalyst, polymer, unreacted monomer and optionally dissolved hydrogen. The top surface of the reactor slurry within the internal reactor volume 107 defines a reactor liquid level 111.

The reactor 301 comprises a reactor baffle system comprising at least one baffle 112, the at least one baffle 112 comprising a baffle top 113 and a baffle bottom 114, where the at least one baffle 112 is connected to the reactor inner wall surface 102 and extends longitudinally along the reactor inner wall surface 102 and radially into the internal reactor volume 107. The baffle top 113 is below the reactor liquid level 111. Location of the baffle top below the reactor liquid level 111 prevents deposition of solids onto the baffle.

The reactor 301 also comprises a reactor inlet 115 for receiving cooled slurry from the cooler 110. The reactor inlet 115 is located on the top reactor head 106 or the cylindrical reactor wall 101 and is connected to a cooled slurry feed line 116 having a feed line inlet end 117 and a feed line discharge end 118. The feed line discharge end 118 is located in the internal reactor volume 107 below the reactor liquid level.

Both the bottom 105 and top 106 reactor heads can be chosen from elliptical, torispherical or hemispherical heads. The reactor 301 can also optionally be equipped with a heat transfer jacket 119 on the outside surface of the reactor. Heat-transfer fluid is pumped through the heat transfer jacket 119 to carry heat away from the reactor 301. The heat transfer fluid can be any one used for the temperature ranges employed, e.g., water or a heat transfer oil. Heat will additionally be removed from the reactor 301 by using pump 126 to pump a portion of the reactor slurry from reactor 301 via reactor outlet 109 and pump inlet line 127, through pump discharge line 128 to cooler 110, and then back to the reactor 301 via line 129 and reactor inlet 115. Reactor slurry exits the reactor via line 130 upstream of cooler 110 and flows to flash drum 200. Flash drum 200 separates the reactor slurry into a vapor stream that flows through line 131 and liquid slurry product that flows through line 132.

The reactor comprises inlet and outlet connections sufficient to perform the polymerization. For example, the reactor can be equipped with inlet connections for receiving catalyst 122, hydrogen 123, ethylene/monomers 124 and diluent 125. A slurry forms from the solid polymer particles produced in the polymerization reactor 301 and the diluent, unreacted monomer, and catalyst.

Figure 2:
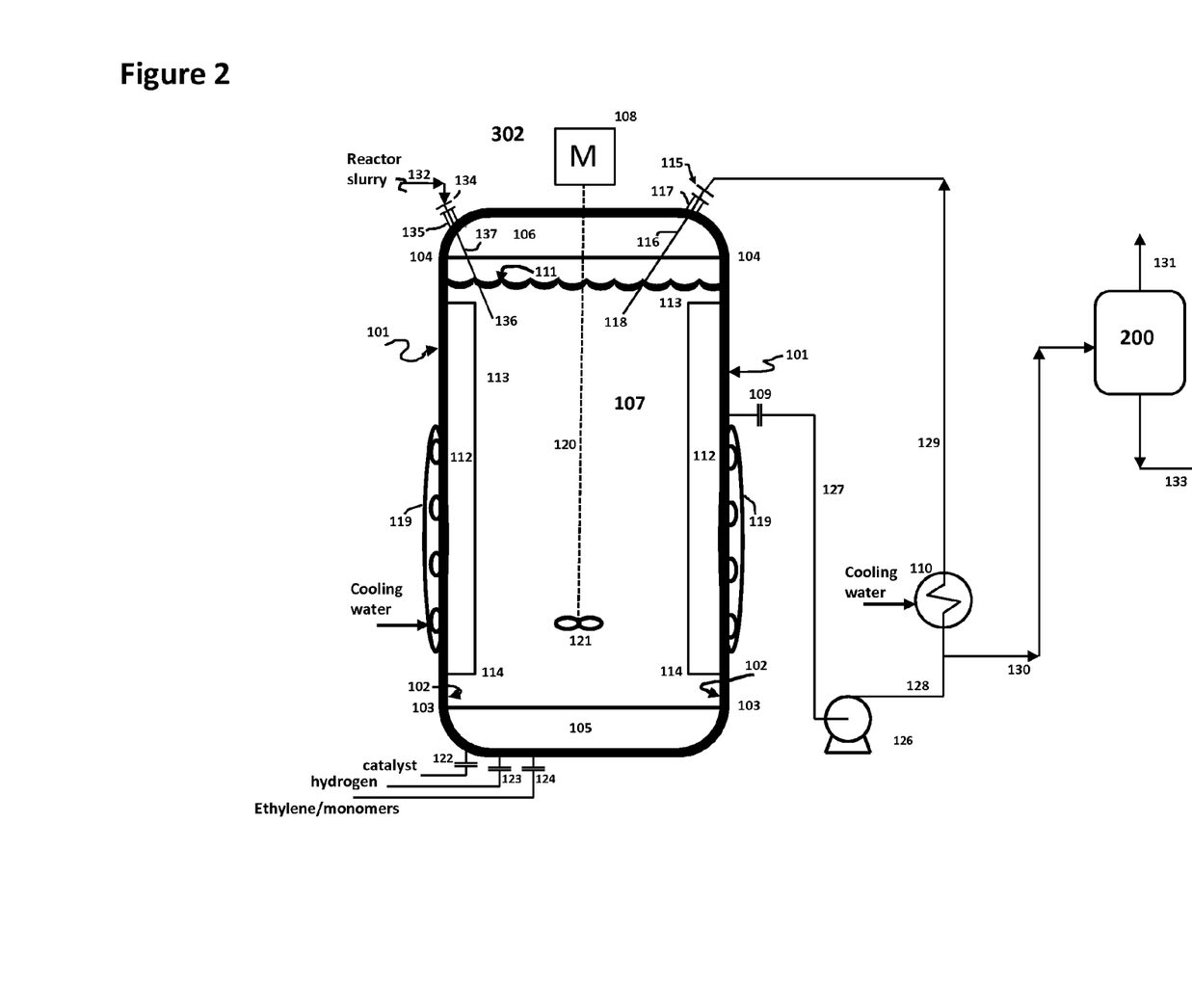
FIG. 2 depicts an illustrative flow diagram of an ethylene slurry polymerization system comprising a polymerization slurry reactor, external pump and cooler, inlet for receiving reactor slurry from a second polymerization slurry reactor, an agitator and baffle system.

Reactor 301 illustrated in FIG. 1 can be operated as a stand-alone reactor or as the first reactor in a multi-reactor slurry polymerization cascade. Reactors following the first reactor in the multi-reactor slurry polymerization cascade additionally receive reactor slurry from a previous reactor. FIG. 2 shows such a reactor 302 following a first reactor 301.

Reactor 302 is configured similarly to reactor 301 of FIG. 1, except that it further comprises a second reactor inlet 134 for receiving, through line 132, liquid slurry product from a previous reactor 301 or 302. The reactor inlet 134 is located on the top reactor head 106 or the cylindrical reactor wall 101 and is connected to slurry feed line 137 having a slurry feed line inlet end 135 and a slurry feed line discharge end 136. The feed line discharge end 136 is located in the internal reactor volume below the reactor liquid level.

Reactor 302 shown in FIG. 2 can be any subsequent polymerization reactor in a multi-reactor cascade of slurry polymerization reactor; i.e. reactor 302 can be a second reactor in a multi-reactor slurry polymerization process or it can be a third or a further downstream reactor in a multi-reactor slurry polymerization process.

Figure 3:
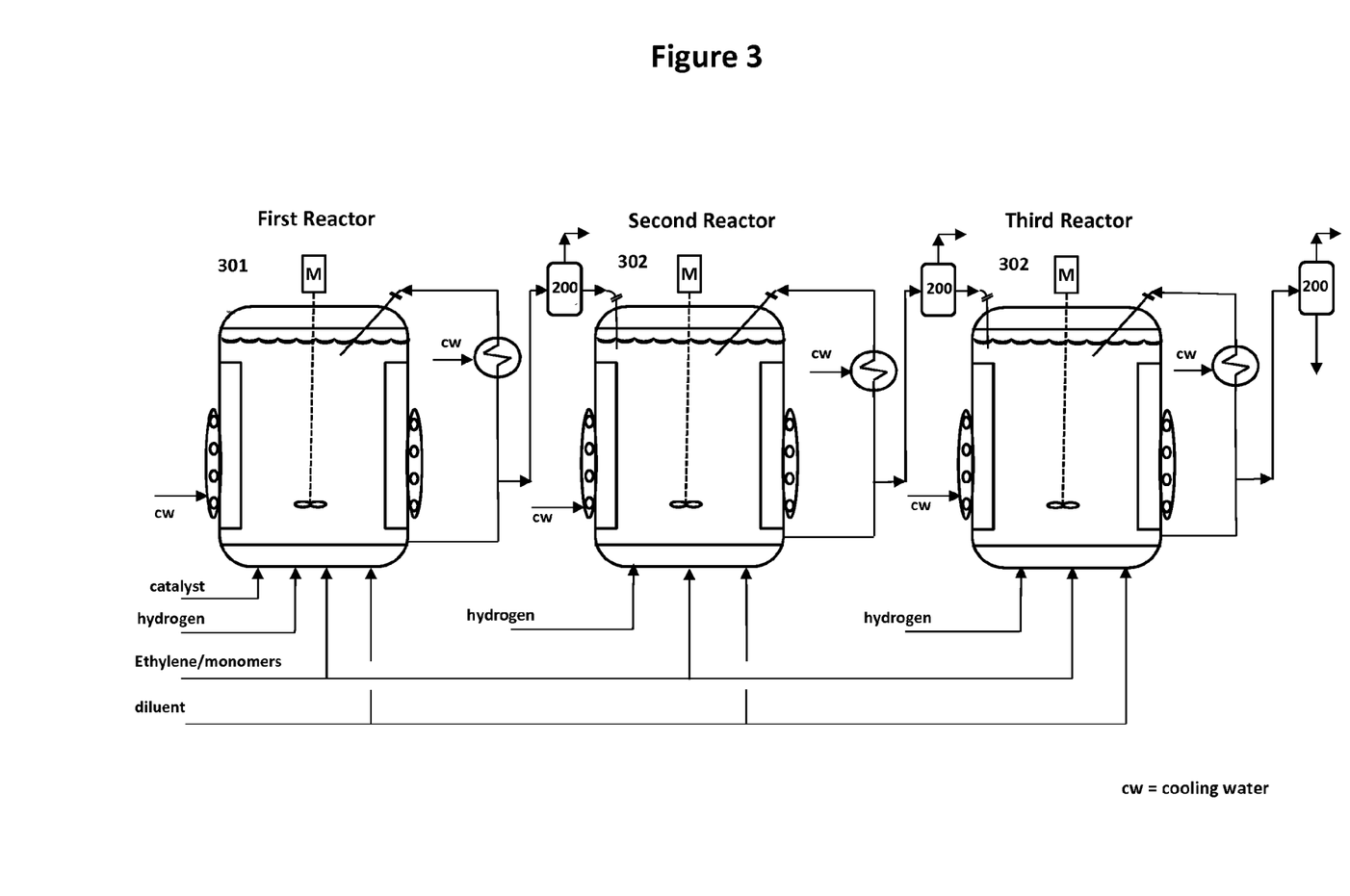
FIG. 3 depicts an illustrative flow diagram of a three-reactor cascade system for the polymerization of ethylene.

In an embodiment of the present disclosure, the multi-reactor process includes three reactors operating in series; i.e. three reactors arranged as cascade. FIG. 3 shows an example in which in a first polymerization reactor, which is configured as reactor 301 shown in FIG. 1, monomers are polymerized in the presence of catalyst, diluent, ethylene and optionally hydrogen and comonomer to form polyethylene in a reactor slurry that is in suspended form. The reactor slurry of the first polymerization reactor is transferred to a first flash drum 200 which separates gas from the reactor slurry, with the separated liquid slurry product being routed to a second polymerization reactor, which is configured as reactor 302 shown in FIG. 2. Ethylene, diluent and optionally hydrogen and comonomer are routed to the second polymerization rector where a polymerization reaction is conducted in the slurry to form additional polyethylene. The reactor slurry of the second polymerization reactor is transferred to a second flash drum 200 which separates gas from the reactor slurry, with the separated liquid slurry product being routed to a third polymerization reactor, which is configured as reactor 302 shown in FIG. 2. Ethylene, diluent and optionally hydrogen and comonomer are routed to the third polymerization rector where a polymerization reaction is conducted in the slurry to form additional polyethylene. The reactor slurry of the third polymerization reactor is transferred to a third flash drum 200 which separates gas from the reactor slurry, with the liquid slurry product being forwarded for solid/liquid separation and further processing of the polymer. The nature and the amount of the comonomer(s) in the different reactors can the same or different.

Although FIG. 3 illustrates a three-reactor system, it should be understood that the process can also include one or two-reactor systems, where the first reactor is configured as in FIG. 1 and the second reactor is configured as in FIG. 2. Reactor systems containing more than three reactors can also be used, where fourth and subsequent reactors are configured as in FIG. 2.

Baffle System

The reactors used in the polymerization process include a reactor baffle system comprising at least one baffle 112. Baffles aid the mixing of fluids in tanks/reactors by preventing mere swirling of the tank/reactor contents. Without baffles, there is little shear of the solids in the liquid.

The baffle 112 has a baffle top 113 disposed proximate to the top head 106 of the reactor 301 or 302 and a baffle bottom 114 disposed proximate to the bottom head 105 of the reactor 301 or 302. The baffle 112 may be a single rectangular plate or series of plates that are mechanically joined to form a continuous plate, where the long axis of the rectangle is parallel to the longitudinal axis of the reactor 301 or 302, and the short axis of the rectangle is parallel to the radial axis of the reactor 301 or 302. Baffle 112 is connected to the reactor inner wall surface 102 either continuously or at discrete connection points, its length extending longitudinally along the reactor inner wall surface 102, and its width extending radially into the internal reactor volume 107. The baffle bottom 114 may be at a point within 30 cm of the reactor bottom tangent 103, i.e., the baffle bottom 114 is located at a point in the range of 30 cm below the reactor bottom tangent 103 to a point 30 cm above the reactor bottom tangent 103. Thus, the distance from the baffle bottom to the bottom tangent is not more than 30 cm.

The baffle top 113 is below the liquid level of the reactor 111. The baffle top 113 may be at least 10 cm below the reactor liquid level 111, or at least 15 cm below the reactor liquid level 111, or between 15 and 30 cm below the reactor liquid level 111. In an embodiment, the baffle top 113 is between 20 and 30 cm below the reactor liquid level 111.

The width of the baffle is the portion of the baffle that extends into the internal reactor volume 107. The width of the baffle may ranges between $\frac{1}{10}^{th}$ and $\frac{1}{48}^{th}$ the reactor diameter or between $\frac{1}{10}^{th}$ and $\frac{1}{24}^{th}$ the reactor diameter.

The baffles 112 may be installed flush with the inner reactor surface 102 along its length or installed off-wall. When installed off-wall, the distance between the inner reactor surface 102 and the baffle 112 may be between $\frac{1}{72}^{nd}$ and 1.0 baffle width, or between $\frac{1}{72}^{nd}$ and $\frac{1}{4}^{th}$ the baffle width.

In an embodiment of the present disclosure, the baffle system comprises at least two baffles 112. The baffle system may contain 3 to 4 baffles 112, or the baffle system contains four baffles 112. When two baffles 112 are present, the baffles may be arranged with a 180 degree spacing between the baffles along the reactor inner wall surface 102. When three baffles 112 are present, the baffles may be arranged with a 120 degree spacing between the baffles along the inner reactor wall surface. When four baffles are present, the baffles may be arranged with a 90 degree spacing between the baffles along the inner reactor wall surface. In an embodiment, four baffles 112 are present.

The arrangement of baffles and slurry feed lines according to the present disclosure prevents or reduces fouling of the baffles and mechanical cross pieces supporting the baffles, by eliminating flashing of liquid from the slurry returned from the cooler or the previous reactor, thereby minimizing the formation of polymer lumps and splashing of the slurry onto the reactor inner wall surface, where the polymer particles/lumps can adhere.

EXAMPLES

The following Examples further detail and explain the claimed ethylene polymerization process.

Comparative Example A

Ethylene was polymerized in a three-reactor cascade to form polyethylene at a temperature of 79° C. and pressure of 0.45 MPa in the presence of a Ziegler type catalyst, triethylaluminum cocatalyst, 1-butene comonomer, and hydrogen, in a medium of hexane as a solvent. The reactor contents were in the form of a slurry containing high density polyethylene polymer, dissolved raw materials, and liquid solvent. The heat of reaction was removed by pumping the slurries through an external coolers and recycling to the reactors through the top elliptical head. The total throughput of the plant was 18 t/h, with the second reactor receiving 6.8 t/h of ethylene. The polyethylene produced in the second reactor had an $MI_5$ of 5 dg/min, determined according to DIN EN ISO 1133:2005, condition T, at a temperature of 190° C. under a load of 5 kg; and a density of 0.950 g/cm$^3$.

All three reactors were of the same design. Each of the reactors was a cylindrical vessel with elliptical heads at the top and at the bottom, and were equipped with four baffles arranged with a 90° spacing between them, along the periphery of the reactor. Each of the reactors was also equipped with an agitator to facilitate the mixing process. The reactor baffles were attached to the reactor surface by means of support plates at different points along the length of the reactor, with the top of the baffle being positioned at 250 mm below the top tangent line. The slurry return line from the cooler discharged the cooled slurry into the reactor at a point 600 mm below the top tangent line, and the slurry from the upstream reactor/flash vessel discharged at a point 350 mm below the top tangent line.

The level in the cylindrical portion of the reactors was measured with radioactive level transmitters, where the top tangent of the reactor corresponded to a level of 100%, and a point 1500 mm below the top tangent corresponded to a 50% level. The level of the second reactor of the three-reactor cascade was maintained at 50% of the radioactive level transmitter range. At this operating level, the top of the baffle, outer cooler slurry discharge point, and upstream reactor slurry discharge point lies in the gas phase. The slurry pump drew a current of 32 A.

Figure 4:
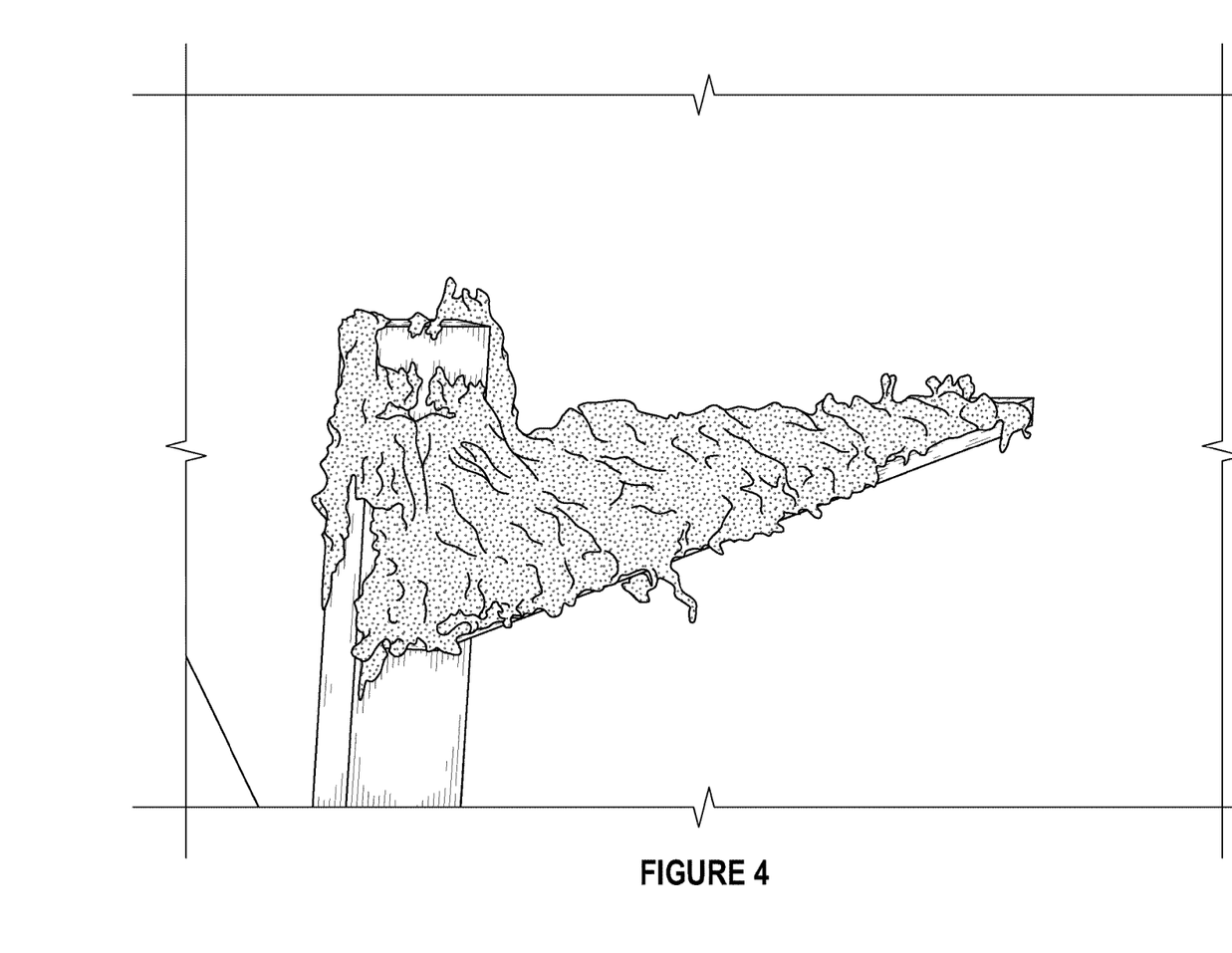
FIG. 4 depicts an image of lumps of polymer found on the baffle supports.

The reactors were shut down in preparation for a change in polyethylene product grade, where the second reactor would produce a polymer having an $MI_5$ of 1.2 dg/min. and a density of 0.956 g/cm$^3$, however, the slurry circulation was continued. Following the shutdown, process lines were flushed with solvent into the second reactor, resulting in an increase in the level of the reactor to 95%. At this reactor level, the baffles' top support plates were submerged within the liquid pool. Immediately after the increase in level, the slurry pump current dropped to 27 A, indicating a drop in the slurry flow through the slurry pumps. Inspection of the pumps revealed that the impeller was obstructed with polymer lumps. Physical inspection of the second reactor revealed deposition of polymer on the top support plates of the baffles. An exemplary image of lumps of polymer fouling from the slurry pump is shown in FIG. 4.

Example 1

For the second reactor of the three-reactor cascade described in Comparative Example A, the position of the radioactive level transmitter was changed so that the measured level ranged from a point 100 mm above the tangent line, which corresponded to 100%, to a point 1400 mm below the tangent line, which corresponded to a 0% level. The standard operating level was changed to 80% of the radioactive level transmitter range, which corresponded to a point 200 mm below the top tangent line. At this operating level, the top of the baffles, the cooled slurry discharge point and the upstream reactor slurry inlet are submerged within the liquid. Increasing or decreasing the reactor level from this point did not result in any drop in the slurry pump current. This indicates that no polymer deposits were available to be dislodged from the reactor baffle or the baffle support plate. The total through-put of the plant was 20 t/h, and the second reactor received 7.5 t/h of ethylene. The second reactor produced a polymer having an $MI_5$ of 1.2 dg/min. and a density of 0.956 g/cm$^3$.

Example 1 and Comparative Example A demonstrate that maintaining the reactor liquid level above the top of the baffles prevents accumulation of polymer solids on the baffle. The otherwise accumulated solids on the baffles are subsequently dislodged whenever there is an increase in the level above the baffles, or the accumulated polymer solids grow to a level that cannot be supported. After the accumulated solids are discharged into the reactor, the solids flow to the pump, where the pump impeller gets blocked. Increase of the reactor level from a point that already exceeds the top of the baffle does not result in any dislodging of polymer solid lumps, since there is no accumulation of the polymer lumps on the baffles, mechanical cross pieces supporting the baffles and the reactor inner wall surface, thus preventing the blockage of the slurry pumps.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

We claim:
1. A slurry polymerization process comprising polymerizing monomers in a reactor at a temperature from 60° C. to 95° C. and a pressure from 0.15 MPa to 3.0 MPa to form polyethylene where the polymerization occurs in the presence of a catalyst, monomers, diluent and optionally hydrogen in the reactor slurry, the reactor comprising:
   a cylindrical reactor wall comprising an inner reactor wall surface, extending from a bottom tangent to a top tangent;
   a bottom reactor head connected to the cylindrical reactor wall at the bottom tangent;

a top reactor head connected to the cylindrical reactor wall at the top tangent, the cylindrical reactor wall, bottom reactor head and top reactor head forming an internal reactor volume;

an agitator for mixing the contents of the internal reactor volume;

a reactor outlet for feeding a reactor slurry to a cooler, the reactor slurry comprising diluent, catalyst, polymer, unreacted monomer and optionally dissolved hydrogen, a reactor baffle system comprising at least one baffle, the at least one baffle comprising a baffle top and a baffle bottom, where the at least one baffle is connected to the reactor inner wall surface and extends longitudinally along the reactor inner wall surface and radially into the internal reactor volume, a first reactor inlet for returning cooled slurry from the cooler as a first reactor slurry stream; and a cooled slurry feed line having a first feed line inlet end, which is connected to the first reactor inlet, and a first feed line discharge end, wherein the top surface of the reactor slurry within the internal reactor volume defines a reactor liquid level and the baffle top and the first feed line discharge end are located below the reactor liquid level.

2. The process of claim 1, wherein the reactor is a stand-alone polymerization reactor or a first reactor of a multi-reactor cascade of slurry polymerization reactors.

3. The process of claim 1, wherein the reactor further comprises a second reactor inlet for receiving a second reactor slurry stream; and a second reactor slurry stream feed line having a second feed line inlet end, which is connected to the second reactor inlet, and a second feed line discharge end, and the second feed line discharge end is located below the reactor liquid level.

4. The process of claim 3, wherein the reactor is a subsequent polymerization reactor in a multi-reactor cascade of slurry polymerization reactors and the second reactor slurry stream is the feed stream of the reactor slurry transferred from the previous reactor of the cascade of polymerization reactors.

5. The process of claim 1, wherein the polymerization is a polymerization carried out in a cascade of polymerization reactors and the slurry polymerization process carried out in the first polymerization reactor of the cascade is the process of claim 1.

6. The process of claim 5, wherein the cascade of polymerization reactors has two polymerization reactors connected in series.

7. The process of claim 5, wherein the cascade of polymerization reactors has three polymerization reactors connected in series.

8. The process of claim 1, wherein the baffle top is at least 10 cm below the reactor liquid level.

9. The process of claim 1, wherein the distance from the baffle bottom to the bottom tangent is not more than 30 cm.

10. The process of claim 1, wherein the baffle top is below the top tangent.

11. The process of claim 1, wherein the baffle system comprises two baffles arranged with a 180 degree spacing between the baffles along the inner reactor wall surface.

12. The process of claim 1, wherein the baffle system comprises three baffles arranged with a 120 degree spacing between the baffles along the inner reactor wall surface.

13. The process of claim 1, wherein the baffle system comprises four baffles arranged with a 90 degree spacing between the baffles along the inner reactor wall surface.

14. The process of claim 1, wherein the polyethylene produced by the process has a density in the range of from 0.935 g/cm$^3$ to 0.97 g/cm$^3$.

15. The process of claim 1, wherein the catalyst is selected from Phillips catalysts, Ziegler type catalysts or single-site catalysts.

16. A slurry polymerization process comprising polymerizing monomers in a stand-alone polymerization reactor at a temperature from 60° C. to 95° C. and a pressure from 0.15 MPa to 3.0 MPa to form polyethylene where the polymerization occurs in the presence of a catalyst, monomers, diluent and optionally hydrogen in the reactor slurry, the reactor comprising:

a cylindrical reactor wall comprising an inner reactor wall surface, extending from a bottom tangent to a top tangent;

a bottom reactor head connected to the cylindrical reactor wall at the bottom tangent;

a top reactor head connected to the cylindrical reactor wall at the top tangent, the cylindrical reactor wall, bottom reactor head and top reactor head forming an internal reactor volume;

an agitator for mixing the contents of the internal reactor volume;

a reactor outlet for feeding a reactor slurry to a cooler, the reactor slurry comprising diluent, catalyst, polymer, unreacted monomer and optionally dissolved hydrogen, a reactor baffle system comprising at least one baffle, the at least one baffle comprising a baffle top and a baffle bottom, where the at least one baffle is connected to the reactor inner wall surface and extends longitudinally along the reactor inner wall surface and radially into the internal reactor volume, a first reactor inlet for returning cooled slurry from the cooler as a first reactor slurry stream; and a cooled slurry feed line having a first feed line inlet end, which is connected to the first reactor inlet, and a first feed line discharge end, wherein the top surface of the reactor slurry within the internal reactor volume defines a reactor liquid level and the baffle top and the first feed line discharge end are located below the reactor liquid level.

17. A slurry polymerization process comprising polymerizing monomers in a multi-reactor cascade of slurry polymerization reactors comprising a first reactor and one or more subsequent polymerization reactors at a temperature from 60° C. to 95° C. and a pressure from 0.15 MPa to 3.0 MPa to form polyethylene where the polymerization occurs in the presence of a catalyst, monomers, diluent and optionally hydrogen in the reactor slurry, the first reactor and the subsequent polymerization reactors comprising:

a cylindrical reactor wall comprising an inner reactor wall surface, extending from a bottom tangent to a top tangent;

a bottom reactor head connected to the cylindrical reactor wall at the bottom tangent;

a top reactor head connected to the cylindrical reactor wall at the top tangent, the cylindrical reactor wall, bottom reactor head and top reactor head forming an internal reactor volume;

an agitator for mixing the contents of the internal reactor volume;

a reactor outlet for feeding a reactor slurry to a cooler, the reactor slurry comprising diluent, catalyst, polymer, unreacted monomer and optionally dissolved hydrogen, a reactor baffle system comprising at least one baffle, the at least one baffle comprising a baffle top and a baffle bottom, where the at least one baffle is connected to the reactor inner wall surface and extends longitudinally along the reactor inner wall surface and radially into the internal reactor volume, a first reactor inlet for returning cooled slurry from the cooler as a first reactor slurry stream; and a cooled slurry feed line having a first feed line inlet end, which is connected to the first reactor inlet, and a first feed line discharge end, wherein the top surface of the reactor slurry within the internal reactor volume defines a reactor liquid level and the baffle top and the first feed line discharge end are located below the reactor liquid level, and wherein the subsequent polymerization reactors further comprise a second reactor inlet for receiving a second reactor slurry stream, which is the feed stream of the reactor slurry transferred from the previous reactor of the cascade of polymerization reactors; and a second reactor slurry stream feed line having a second feed line inlet end, which is connected to the second reactor inlet, and a second feed line discharge end, and the second feed line discharge end is located below the reactor liquid level.

18. The process of claim 17, wherein the cascade of polymerization reactors has two polymerization reactors connected in series.

19. The process of claim 17, wherein the cascade of polymerization reactors has three polymerization reactors connected in series.

20. The process of claim 17, wherein the baffle tops of the baffle system are below the top tangent of the reactors.

* * * * *